United States Patent
Papierniak et al.

(12)

(10) Patent No.: US 7,203,675 B1
(45) Date of Patent: Apr. 10, 2007

(54) METHODS, SYSTEMS AND DATA STRUCTURES TO CONSTRUCT, SUBMIT, AND PROCESS MULTI-ATTRIBUTAL SEARCHES

(75) Inventors: Karen A. Papierniak, Fenton, MI (US); Eric D. Dunsker, Atlanta, GA (US)

(73) Assignee: NCR Corp., Dayton, OH (US)

( * ) Notice: Subject to any disclaimer, the term of this patent is extended or adjusted under 35 U.S.C. 154(b) by 278 days.

(21) Appl. No.: 10/078,616

(22) Filed: Feb. 19, 2002

(51) Int. Cl.
*G06F 17/30* (2006.01)
*G06F 7/00* (2006.01)
*G06F 17/00* (2006.01)

(52) U.S. Cl. .............................. 707/3; 707/1; 707/104.1
(58) Field of Classification Search .................... 707/1, 707/3, 104.1; 705/14
See application file for complete search history.

(56) References Cited

U.S. PATENT DOCUMENTS

| | | | |
|---|---|---|---|
| 5,659,732 A | 8/1997 | Kirsch | |
| 5,749,081 A | 5/1998 | Whitels | |
| 5,893,110 A | 4/1999 | Weber et al. | |
| 6,006,217 A | 12/1999 | Lumsden | |
| 6,256,623 B1 * | 7/2001 | Jones | 707/3 |
| 6,266,663 B1 | 7/2001 | Fuh et al. | |
| 6,356,899 B1 * | 3/2002 | Chakrabarti et al. | 707/5 |
| 6,691,123 B1 * | 2/2004 | Gulliksen | 707/101 |
| 6,728,685 B1 * | 4/2004 | Ahluwalia | 705/26 |
| 2002/0013760 A1 * | 1/2002 | Arora et al. | 705/37 |
| 2002/0078020 A1 * | 6/2002 | Lawton | 707/1 |
| 2002/0174089 A1 * | 11/2002 | Tenorio | 707/1 |
| 2003/0093414 A1 * | 5/2003 | Litzow et al. | 707/3 |
| 2003/0208396 A1 * | 11/2003 | Miller et al. | 705/14 |
| 2004/0002973 A1 * | 1/2004 | Chaudhuri et al. | 707/7 |

* cited by examiner

*Primary Examiner*—Jeffrey Caffin
*Assistant Examiner*—Cindy Nguyen
(74) *Attorney, Agent, or Firm*—Schwegman, Lundberg, Woessner & Kluth; James M. Stover

(57) ABSTRACT

Methods, systems, and data structures are provided to construct, submit, and process multi-attributal searches. An item, which includes a plurality of attributes, is received. Each attribute includes an attribute value. One or more of the attribute values are modified, and the modified item is sent to a number of data stores or processing devices. If a substantial match on the number of data stores or the processing devices is detected then answer items are received representing the substantial matches that were found on the number of data stores or the processing devices. The answer items are ranked and presented.

20 Claims, 6 Drawing Sheets

SHIRT #1

VENDOR #1

NAME: MID - SLEEVE
MATERIAL: 100% COT.
COLOR: PURPLE
CUT: V NECK
SKU: 1232112
CARE: MACHINE WASH
PRICE: $9.00

SHIRT #2

VENDOR #2

NAME: MID - SLEEVE
MATERIAL: 100% COT.
COLOR: GREEN OR WHITE
CUT: V NECK
SKU: 1233332
CARE: MACHINE WASH
PRICE: $10.50

SHIRT #3

VENDOR #3

NAME: MID - SLEEVE
MATERIAL: 100% COT.
COLOR: GREEN OR PURPLE
CUT: CREW
SKU: 1233299
CARE: MACHINE WASH
PRICE: $10.50

METHODS, SYSTEMS AND DATA STRUCTURES TO CONSTRUCT, SUBMIT, AND PROCESS MULTI-ATTRIBUTAL SEARCHES

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright© 2002, NCR Corp. All Rights Reserved.

FIELD OF THE INVENTION

The present invention relates to processing multi-attributal search requests, and in particular to methods, systems, and data structures used to construct multi-attributal search requests, submit multi-attributal search requests, and process answer sets received in response to submitted multi-attributal search requests.

BACKGROUND OF THE INVENTION

Searches are typically conducted using a linear or with a flat technique. In other words, an end-user constructs a search request by providing a number of search terms or phrases and passing the terms or phrases to a search engine. Each search term or phrase represents an equally important term or phrase that is compared by the search engine against a target data corpus, which can include a variety of matching terms and phrases. Generally within the data corpus, matching terms and phrases are associated with data files often referred to as documents. The search terms and phrases are further constrained by a search logic with defines how all the terms and phrases are to be matched in the search request against documents appearing in the target data corpus. For example, a search engine can employ Boolean logic consisting of logical operators, such as "AND," "OR", "NOT," and the like.

Accordingly, with some search engines the end-user also provides the search logic for the search request by using Boolean constructions to associate the terms and phrases included within the search request. In other search engines, if the end-user includes no search logic then the search engine defaults to an "OR" logic and implements a searching algorithm to further constrain the results of the search request when performing a search against the target data corpus. For example, some search engines only include matching documents within the target data corpus having a pre-defined frequency of recurring terms or phrases appearing within any of the matching documents found.

Other search engines permit a more structural or hierarchical search requests to be provided by an end-user. Typically, these search engines allow the end-user to identify structural syntax in the search request that identifies where in a target document a specific term or phrase is to occur. For example, a target document can structurally be represented as a document with a title and an author, where the end-user desires documents having only terms or phrases occurring within the title of the target document and documents with a specific author. In this example, a search engine providing a hierarchical or structural search request would permit the end-user to define the title and author limitations in the initial search request to constrain the search.

Additionally, search engines can provide a variety of other useful features to the end-user, such as search term morphology where the singular and plural forms of search terms are recognized by the search engine when conducting the search on behalf of the end-user. Generally, morphology is achieved by the search engine using stemming techniques, where any end-user received search terms are decomposed into their root word forms. And, the target data corpus is indexed on only the root word forms of the search terms. Furthermore, searches can be augmented to include synonyms or thesaurus terms associated with the search terms.

In general when a search is performed against a data corpus, an answer set is returned, the answer set includes matching documents found within the target data corpus as constrained by the search terms and search engine processing logic. Search precision is defined as a total number of truly relevant documents included within the answer set divided by a total number of all documents included within the answer set. Search recall is defined as the total number of all documents included within the answer set divided by all relevant documents that exist in the target data corpus that truly satisfies the initial search request. Search accuracy is defined as the average of the search precision and the search recall. Generally, as search engines increase search precision the search recall proportionally decreases, and vice-versa.

Once an answer set is returned from a search occurring against a target data corpus, the documents within the answer set are ranked according to a variety of ranking algorithms. When the answer set is ranked, the documents within the answer set appear in a generated order, where the most relevant document appears first and the least relevant document appears last within the answer set. Some ranking algorithms, rank documents based on dates or other metadata features associated with the documents included within the answer set.

Further, some ranking algorithms rank documents based on the frequency and location of matched terms and phrases occurring within a single document of the answer set as compared to an average of term or phrase frequency of matched terms occurring for an average document appearing within the answer set. Some Internet ranking algorithms, will rank documents within the answer set based on extrinsic factors, such as a total number of external websites which link to a document included within the answer set. In these algorithms, the documents popularity as opposed to its true relevancy controls how the document is ranked within the answer set.

Worldwide web (WWW) search engines are provided to end-users via a browser interface connected to the Internet, these search engines typically have good recall but have poor search precision and poor search ranking techniques. As a result, end-users are often extremely disappointed with WWW search engines and are often inundated with irrelevant and undesirable documents within the answer set, which the end-user is forced to inspect in search of relevant and important documents to the end-user. Moreover, when an end-user views a selected document within an answer set provided by an Internet search engine, the end-user is not presented with the document in a format that assists the end-user in rapidly ascertaining whether the selected document is useful to the end-user.

Furthermore, the browser interfaces and search request construction techniques employed by existing WWW search engines are cumbersome, cryptic, and largely linear. Accordingly, the end-user is circumscribed in the manner and way that the initial search request is provided to any WWW search engine. Also, the end-user is often not permitted to select and define which target data corpora to submit a search request for processing, since the target data corpora are generally predefined within the search engine. Correspondingly, the end-user is not capable of limiting the target data corpora in an attempt to reduce the total number of irrelevant documents received from a search.

Accordingly, as is apparent to one of ordinary skill in the art a variety of limitations with existing WWW search engines frustrate the end-user. These limitations include the difficulty associated with constructing search requests, visualizing search answer sets, digesting search answer sets, and analyzing search answer sets.

As is apparent, there exists a need for providing improved search construction, submission, and processing techniques. More specifically, there exist needs for providing improved non-linear search construction, improved target data corpus selection and submission, and improved search processing and ranking.

SUMMARY OF THE INVENTION

In various embodiments of the present invention, a multi-attributal search is constructed and processed. The search request includes a plurality of attributes. Furthermore, the search request is successfully processed by one or more remote processing devices, when a substantial match on one or more of the attributes associated with the search is found on the one or more remote processing devices.

More specifically and in one embodiment of the present invention, a method of constructing and issuing a multi-attributal search request is provided. An item, which has attributes, is received, each attribute includes an attribute value. A number of the attribute values are modified, and the item is issued to one or more data stores as a search request. Next in response to the search request, one or more answer items are received. The answer items are associated with a substantial match of the item received from one or more of the data stores. The answer items include answer attributes, and each answer attribute has an answer attribute value. The one or more answer items are ranked based on each answer item's attribute values when compared against the item's attribute values.

In another embodiment of the present invention, a method of constructing and issuing a multi-attributal search request is presented. The elements are retrieved with attributes. The attributes are modified, and the elements are configured into an item. Next, one or more destination processing devices are identified where the item is to be sent as a search request. Furthermore, the search request is sent to the one or more identified destination processing devices. A match occurs on a number of the one or more identified destination-processing devices, if the search request is an approximate match for one or more answer items, which reside on the one or more destination processing devices. An answer set is acquired having the one or more answer items from the one or more destination processing devices.

In still another embodiment of the present invention, a search construction and submission system is provided. The system includes an importing set of executable instructions that acquires one or more elements and an editing set of executable instructions that merges, copies, deletes, saves, modifies, and compares the one or more elements and generates an item from the one or more edited or aggregated elements. Moreover, the system includes a submission set of executable instructions that submits an item to one or more servicing data stores and a displaying set of executable instructions that presents an answer set of related items associated with the item. The related items are acquired from the one or more servicing data stores in response to the submitted item from the submission set of executable instructions.

In yet another embodiment of the present invention, a search request data structure residing on a computer readable medium is provided. The search request includes an element identifier, one or more attribute tags, and an attribute value associated with each of the one or more attribute tags. The one or more attribute tags and each associated attribute value are modifiable, and the search request data structure is submitted to one or more data stores. Further, each of the one or more data stores returns one or more responsive items matching the element identifier and substantially matching the one or more attribute tags and corresponding attribute values.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
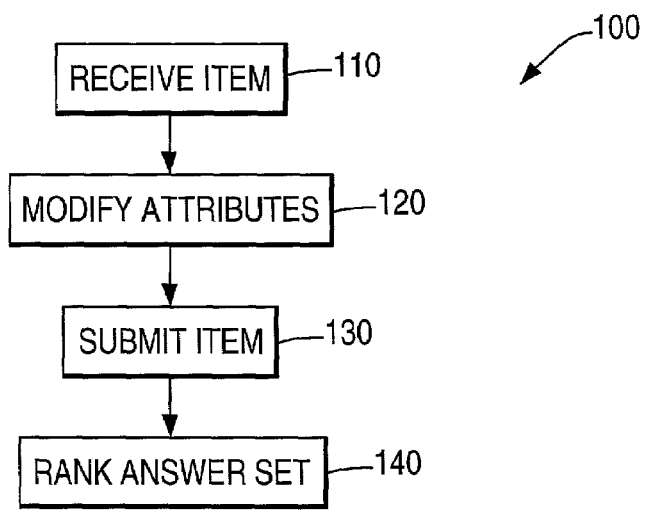
FIG. 1 is a flowchart representing a method of processing multi-attributal searches, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for data storage.

As used herein the phrase "end-user" refers to a person or a software application interacting with the search construction, submission, and processing techniques of the present invention. An end-user, which is a person, interacts by providing data/instructions via an input device (e.g., keyboard, mouse, wand, and the like) interfaced to a graphical user interface (GUI) in communication with a computing device having memory. The end-user, which is an application, interacts through one or more interface sets of executable instructions in communication with a computing device having memory.

Moreover, as used herein the term "item" refers to the subject of a search request. In some embodiments, an item is an identifier for a product, a service, or a search report. In other embodiments, the item represents a person, a place, a historical/sporting event, a topic, and the like. An item includes a plurality of attributes associated with the item. Attributes can include any descriptive or limiting feature associated with the item. For example, a product item can include a color attribute, a size attribute, a stock-keeping unit (SKU) attribute, a source provider attribute, a price attribute, an instruction data attribute, and others.

Attributes, in some embodiments, include attribute tags describing the descriptive or limiting feature and a corresponding attribute value. Attribute values can be text strings, pointers to images, pointers to video data, pointers to audio data, pointers to files, numeric values, or ranges of numeric values. In still more embodiments, items can be further decomposed into elements, where each element represents a specific or limiting feature of one aspect of the item. For example, in some embodiments, a product element can include a price element and source provider element, where each of the elements further include attributes and attribute values. In some embodiments, elements are themselves attributes.

Furthermore in one embodiment, the present invention is implemented by representing the items, elements, attributes, and attribute values in an extensible markup language (XML) and by using any corresponding rendering data languages such as, and by way of example only, extensible style sheets language (XSL). The rendering data language allows the items, elements, attributes, and attribute values to be presented to an end-user. Furthermore in some embodiments, the items, elements, attributes, and attribute values are edited by an end-user using any conventional XML editor, readily available and known to one of ordinary skill in the art (e.g., XMetal, XML SPY, Adept Editor, XED, and others).

Additionally, searches presented in the various embodiments of the disclosure need not be strictly text searches since any valid data store search, including numeric searching is intended to fall within the broad scope of the various presented embodiments.

FIG. 1 illustrates a flowchart representing one method 100 for processing multi-attributal searches, according to the teachings of the present invention. Initially, an end-user interfaces with method 100. In some embodiments, the end-user is a person interfacing with method 100 via an input device (e.g., keyboard, mouse, wand, and the like). The input device is in communication with a computing device and a display, where interaction with the end-user is presented in a GUI on the display to the end-user. In one embodiment, the GUI is embodied in a browser as a series of browser pages/forms presented to the end-user. The browser is interfaced to the Internet having access to the WWW. The pages/forms are represented in any data language format, such as hypertext markup language (HTML), standard generalized markup language (SGML), compatible XML, or others.

In block 110, an item is received from the end-user. The item represents the subject of a search request. The end-user can provide the item by typing in a reference to the item in a GUI input screen of a display, dragging and dropping an image on the display of the item into a working area defined on the display, selecting the item from a pull-down menu in the GUI, and the like. Moreover, in some embodiments the end-user can provide the item by querying a data store, such as a database (e.g., Teradata data base distributed by NCR Corp.), where any responsive item to the query is automatically provided to method 100. In this way, and in some embodiments, the end-user is an application interfaced to method 100.

The item, in more embodiments, is encoded in XML and includes a plurality of attributes. The attributes provide description or limitations to the item. Each attribute includes an attribute value, providing a specific value for each attribute. Moreover, in some embodiments each attribute includes one or more sub-attributes and sub-attribute values. Correspondingly, attributes are capable of having nested levels of sub-attributes. For example, a price attribute can have an attribute tag of "<price>," an attribute value of "$10.00," a sub-attribute tag of "<currency-type>," a sub-attribute value of "USD" (e.g., united states dollars), an attribute calculation operation tag of "<attribute-operation>," and an attribute calculation value associated with performing an arithmetic operation on the attribute value (e.g., $10.00 with decimal rounding to the $100^{th}$ decimal location).

In another example, an attribute of color can be end-user defined or based on industry standards, and the attribute of color can include a variety of sub-attributes. For example an attribute can have an attribute tag of "<color>," an attribute value of "red," a first sub-attribute tag of "<color-name>," a first sub-attribute value of "royal red," a second sub-attribute tag of "<color-industry-standard>," a second sub-attribute value of "deep red," a third sub-attribute tag of "<color-standard-die-mix>," and a third attribute value of "R: 1005, B: 25, G:0, and T: 535." In this way, attributes and sub-attributes can be associated with industry standards for ready comparisons against a variety of disparate potential vendors. Alternatively, simple end-user defined attributes and sub-attributes can be used when no industry standard for a particular attribute is present.

As one of ordinary skill in the art will readily appreciate, the item, the attributes, sub-attributes, and the values are readily parsed and made available to method 100 using conventional XML parsers and editors. Furthermore, by using conventional data rendering languages the XML represented item, is presented to the end-user on the display, in embodiments where the end-user is a person interacting with method 100.

Once the item is received and provided to the end-user, then the item is modified in block 120 by the end-user. Modification can include deleting attribute and attribute value pairs, adding new attribute and attribute value pairs, or changing existing attribute values associated with the item. Similarly, sub-attribute and sub-attribute values can be modified, deleted, changed, or added. The editors can use the combined or modified attributes and attribute value pairs to construct an acceptable search request. For example, an end-user can include an item, within the editor, representing a shirt and having an attribute tag of "<shirt-cut>" with an attribute value of "tee shirt," and an initial sub-attribute tag of "<garment-neck-cut>" with a sub-attribute tag of "v-neck." After including this item within the editor, the end-user can then combine a second item representing a shirt having a sub-attribute tag of <garment-neck-cut>" with a sub-attribute value of "crew-neck." The editor can then use a defined attribute value represented by an attribute tag operation of "<garment-cut-operation> to apply and call a set of executable instructions that will construct a valid search request using the combined and sometimes disparate sub-attribute values requested by the end-user. For example, the operation could produce a single combined item having a sub-attribute value of "crew-v-neck." The operation attribute tags can also be defined and identified in a schema associated with the items. These operation attribute tags can assist in determining valid end-user combined combinations or modifications to the attributes or sub-attributes.

Next in some embodiments, the end-user identifies one or more target data corpora in which the revised item is to be sent as a search request. In other embodiments, the target data corpora are automatically identified by method 100. In still more embodiments, the target data corpora are configured by the end-user upon initial use of method 100.

The target data corpora can include any data source such as, and by way of example only, data stores (e.g. data bases, data warehouses, directories, file systems), websites, removable or fixed computer readable media in communication with method 100, or services in communication with method 100 (e.g., application service providers (ASP), intra organizational Intranets, Internet service providers (ISP), and others). In some embodiments, the target data corpora are further interfaced to applications associated with database report interface modules, thereby permitting the execution of reports against the data corpora (e.g., online analytical processing (OLAP) compatible report applications). In these latter embodiments, the item is a request to the target data corpora to generate or run a report (e.g., OLAP report).

Furthermore, and in some embodiments, the end-user identifies a number of the attributes included within the item that are of high importance to the end-user. In this way, the end-user provides search-matching logic associated with the item to the target data corpora before the item is submitted to the target data corpora as a search request. Moreover, as one of ordinary skill in the art will appreciate a variety of search-matching logic can be associated with the item by the end-user all of which are intended to fall within the broad scope of the present invention.

Once the target corpora are identified, the modified item along with any modifying search logic is submitted to the target data corpora as a search request in block 130. When the target data corpora receive the item as a search request, a query ensues against the data residing on the target data corpora to locate answer items similar to the item. An answer item will be of the same search subject as the submitted item. However unless otherwise indicated by the end-user, there is no requirement that any particular answer item include all the same attribute and attribute value pairs identified in the submitted item. In this way, the answer items are substantial or approximate matches occurring on the target data corpora and need not be exact matches, which is conventionally the case with existing search techniques. Moreover, and as previously discussed, in some embodiments the search request is a report request to generate a report, where the item attributes are instructions provided to database report interface modules, which reside on the target data corpora.

The answer items are received by method 100 from the target data corpora, where each received answer item is ordered and ranked relative to one another to form a ranked answer set in block 140. In some embodiments, the order of the ranked answer set is determined by presenting the most relevant answer item first and the least relevant answer item last, within the answer set. Relevancy is resolved by the number of attribute and attribute value pairs included within each answer item that exactly matches the corresponding attribute and attribute value pairs of the submitted item.

In some embodiments, once the answer set is ranked, each answer item is presented to the end-user via a display, where attribute and attribute value pairs which did not exactly match the end-user's constructed and submitted item are highlighted in unique colors within the display to focus the end-user's attention to the differences. In this way, the end-user can rapidly ascertain the significance and importance of each presented answer item within the answer set.

Moreover in one embodiment of method 100, the item represents a product or a service being offered by a vendor. And, the target data corpora are web sites associated with the vendor's products or services. The end-user is a consumer who retrieves a number of items and edits them to form a single desired item. Retrieval and editing can occur in a browser, or in a customized GUI-based application. The desired item is sent by method 100 to the web sites of vendors having the item for sale. An answer set is returned and ranked by method 100 in the manner described above, with differences in each answer item's attribute and attribute value pairs visually distinguished on the end-user's display for quick mental digestion by the end-user. In some embodiments, an exact match of the desired item is not obtainable and in these embodiments the vendor can use the submitted desired item as a device for gathering consumer requirements for new products or services not presently offered by the vendor. Next, the end-user selects an acceptable answer item from the answer set by clicking a hypertext link, where activation of the link establishes a purchasing session between the end-user and the vendor.

In another embodiment, the item is a merged OLAP report, which the end-user constructed by overlaying two separate OLAP reports to form a single desired and never before used report. In this embodiment, the item is sent to one or more OLAP servers (e.g., target data corpora) where the attribute and attribute value pairs included within the item identify the report processing required by the OLAP servers. In this embodiment, a single report is returned as a single answer item where the answer set consists of the single answer item.

Figure 2:
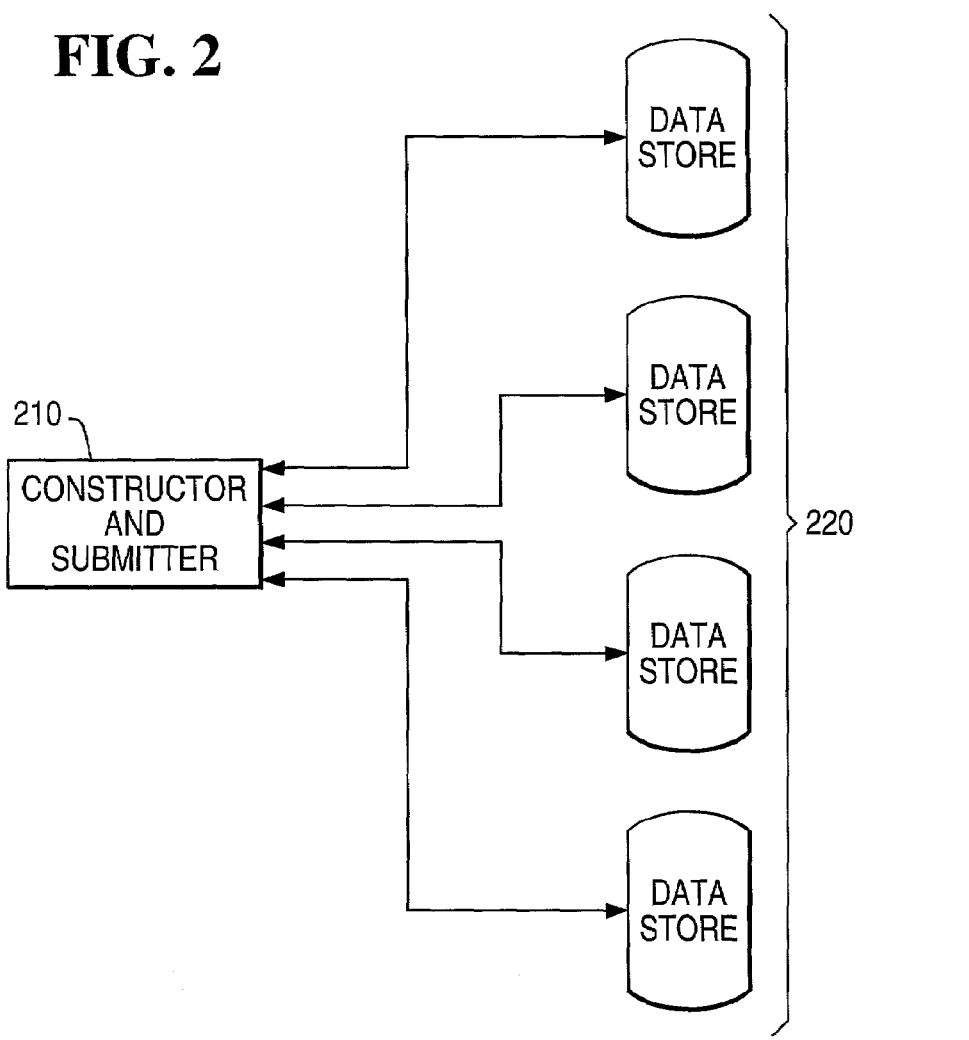
FIG. 2 is a diagram representing an architecture layout for processing multi-attributal searches, according to the teachings of the present invention.

FIG. 2 illustrates a diagram representing one architectural layout 200 for processing multi-attributal searches, according to the teachings of the present invention. The architecture 200 includes a constructor and submitter set of executable instructions 210 and a plurality of data stores 220. In some embodiments, the constructor and submitter set of executable instructions 210 and data stores 200 are connected via a hardwired network connection, and in other embodiments the constructor and submitter set of executable instructions 210 and the data stores are connected and interfaced via a wireless network connection.

The data stores 220 can reside on separate computing devices from a computing device associated with the constructor and submitter set of executable instructions 210. Moreover, each of the data stores includes an interface set of executable instructions operable to communicate with the constructor and submitter set of executable instructions 210. Each computing device includes memory (e.g., volatile and non-volatile). Further, an end-user is operable to communicate with the constructor and submitter set of executable instructions 210. In some embodiments, the end-user is a person communicating with the constructor and submitter set of executable instructions 210 through an input device (e.g., keyboard, mouse, wand, and the like) and a display. In other embodiments, the end-user is itself a set of executable instructions communicating with constructor and submitter set of executable instructions 210.

In one embodiment, the constructor and submitter set of executable instructions 210 resides as an icon workbasket on an end-user's display screen and is interfaced to an end-user's browser connected to the Internet. The data stores 220 are remote websites associated with vendors offering products and services for sale to the end-user. The end-user identifies one or more like items that he/she desires using the Internet, and then drags and drops web pages associated with the desired items into the workbasket 210. Here, attribute and attribute value pairs are added, deleted, and/or modified by the end-user using operations provided in the workbasket 210.

Once a desired item is constructed within the workbasket 210, the end-user submits the desired item to the websites 220 using a submit button provided within the workbasket 210. Moreover, the end-user can flag required attribute and attribute value pairs within the desired item as being required before submitting the desired item to the websites 220. Next, the websites 220 locate answer items and any required attribute and attribute value pairs and returns the answer items to the workbasket 210. The workbasket ranks and visually or audibly distinguishes differing attribute and attribute value pairs within each presented answer item. Next, the end-user selects an acceptable answer item by activating a link included with the answer item and is automatically interfaced to a purchasing set of executable instructions associated with a vendor identified for the selected answer item.

In another embodiment, the constructor and submitter set of executable instructions 210 is a tool accessible to the end-user, and interfaced to data stores 220 which are OLAP servers. The end-user uses the tool 210 to acquire one or more initial reports from the OLAP servers 220. The end-user then constructs an item representing a single desired report where the attributes for the item are specific queries necessary to generate the desired report. The single report is then sent from the tool 210 to the OLAP servers 220 where the item is processed as a single report query and the results returned to the tool 210 as a single answer item, which is then presented to the end-user.

Of course as one of ordinary skill in the art appreciates, a variety of architectures can be used other than the architecture of FIG. 2, to provide multi-attributal search construction, submission, and processing. All such configurations are intended to fall within the broad scope of the present invention.

Figure 3:
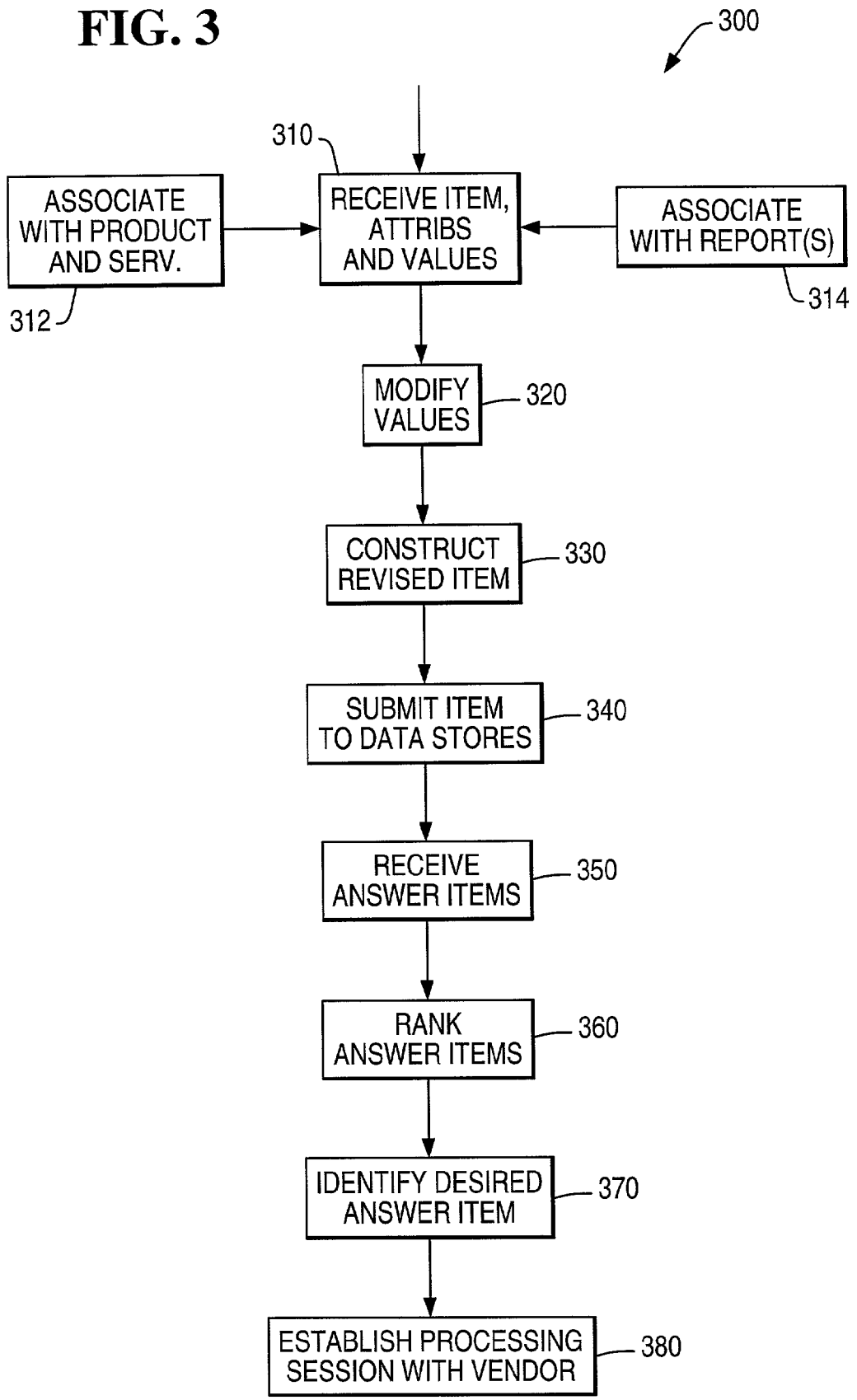
FIG. 3 is a flowchart representing a method of constructing and issuing a multi-attributal search request, according to the teachings of the present invention.

FIG. 3 illustrates a flowchart representing one method 300 for constructing and issuing a multi-attributal search request, according to the teachings of the present invention. In block, 310 an item is received, the item represents the subject of a search request or desired report. The item includes a plurality of attributes, the attributes describe and provide limitations to the item. Furthermore, each attribute includes an attribute value, the attribute values provide specific instances for each attribute of the item. Attribute values can be text strings, pointers to additional data, report query logic, numeric values, numeric ranges of values, and the like.

Initially, an end-user is interfaced to method 300 using an input device (e.g., keyboard, mouse, wand, and the like) and a display interfaced to a computing device in communication with method 300. In other embodiments, the end-user is itself a set of executable instructions directly interfaced to the computing device having method 300. The item is received in block 310 from the end-user, the item can be received directly from the end-user (e.g., end-user inputted through the input device) or the item can be received indirectly from some action of the end-user (e.g., end-user executes an initial query and the results of the query are provided to method 300 as the item.

In some embodiments, the item is identified and associated with a product or a service as depicted in block 312. In more embodiments, the item is associated with a report, such as an OLAP report, in block 314. The method 300 can also maintain a vendor or OLAP service table that associates items with specific target data stores. For example, an item is identified as an OLAP report can be located in a table, maintained in volatile and/or non volatile memory, associated with the computing device communicating with method 300, where when the OLAP report is identified in the table a corresponding entry identifies a specific OLAP server or set of OLAP servers as the specific target data stores. In another example, the item is identified as a product, and a lookup in the table identifies a plurality of vendor websites offering the product for sale.

Once the item is received, in block 320 one or more attribute values associated with the item are modified. In some embodiments, the item, the attributes, and the attribute values are represented in XML format, and an XML editor renders and provides the item, the attributes, and the attribute values for modification. In other embodiments, the one or more attribute values are modified using an application programming interface (API) library through programmatic manipulation. Moreover, in some embodiments the end-user can identified attribute and attribute value pairs as being required within the item, or as being of low or reduced priority. The end-user continues to revise the item as necessary and desired, until a final revised item is constructed in block 330.

The modified item is then issued to the identified data stores as a search request in block 340. The data stores individually locate items having all required attributes defined in the submitted item, but each attribute and attribute value pair included within the submitted item need not match exactly within the data stores. In this way, a substantial or approximate match occurs to one or more answer items within the data stores. In some embodiments, the data stores are databases, web sites, file systems, file directories, ASPs, ISPs, Intranets, and the like. Each answer item includes answer attribute and answer attribute value pairs.

In block 350, the answer items are received and in block 360 the answer items are organized as a ranked answer set of answer items. In some embodiments, a determination of how to rank each answer item is based on the total number of answer attribute and answer attribute value pairs which identically match the originally submitted item's corresponding attribute and attribute value pairs. Moreover, in some embodiments the a determination of how to rank each answer item is based on end-user provided priorities associated with the attribute and attribute value pairs. In still other embodiments, a determination of how to rank each answer item is based on standard industry answer-set processing techniques. Furthermore, the answer items are serially organized in the answer set as a list with the most relevant answer item occurring at the head of the list and the least relevant answer item occurring at the tail of the list.

Further, each answer item occurring within the answer set can be presented to the end-user by visually or audibly distinguishing the differences between the originally submitted item's attribute and attribute value pairs as compared against the answer items' answer attribute and answer attribute value pairs. Visually cues can be presented to the end-user by highlighting the differences, or by providing visual effects, such as blinking text. Audio cues can be provided by having audio alarms play as a context associated with an end-user's input device is placed over a differing answer attribute and answer attribute value pair.

Moreover and in still more embodiments, once a ranked answer set of answer items are presented to the end-user, an identified desired answer item is selected and provided by the end-user to method 300 as depicted in block 370. The desired answer item in some embodiments is a product or service offered by a vendor to the end-user over the Internet via a browser interface. The end-user's selection of the desired item can, in some embodiments, result in the activation of a vendor-provided Internet hypertext link that establishes a purchasing processing session between the end-user and the vendor in block 380 for purposes of electronically acquiring the desired product or service.

Figure 4:
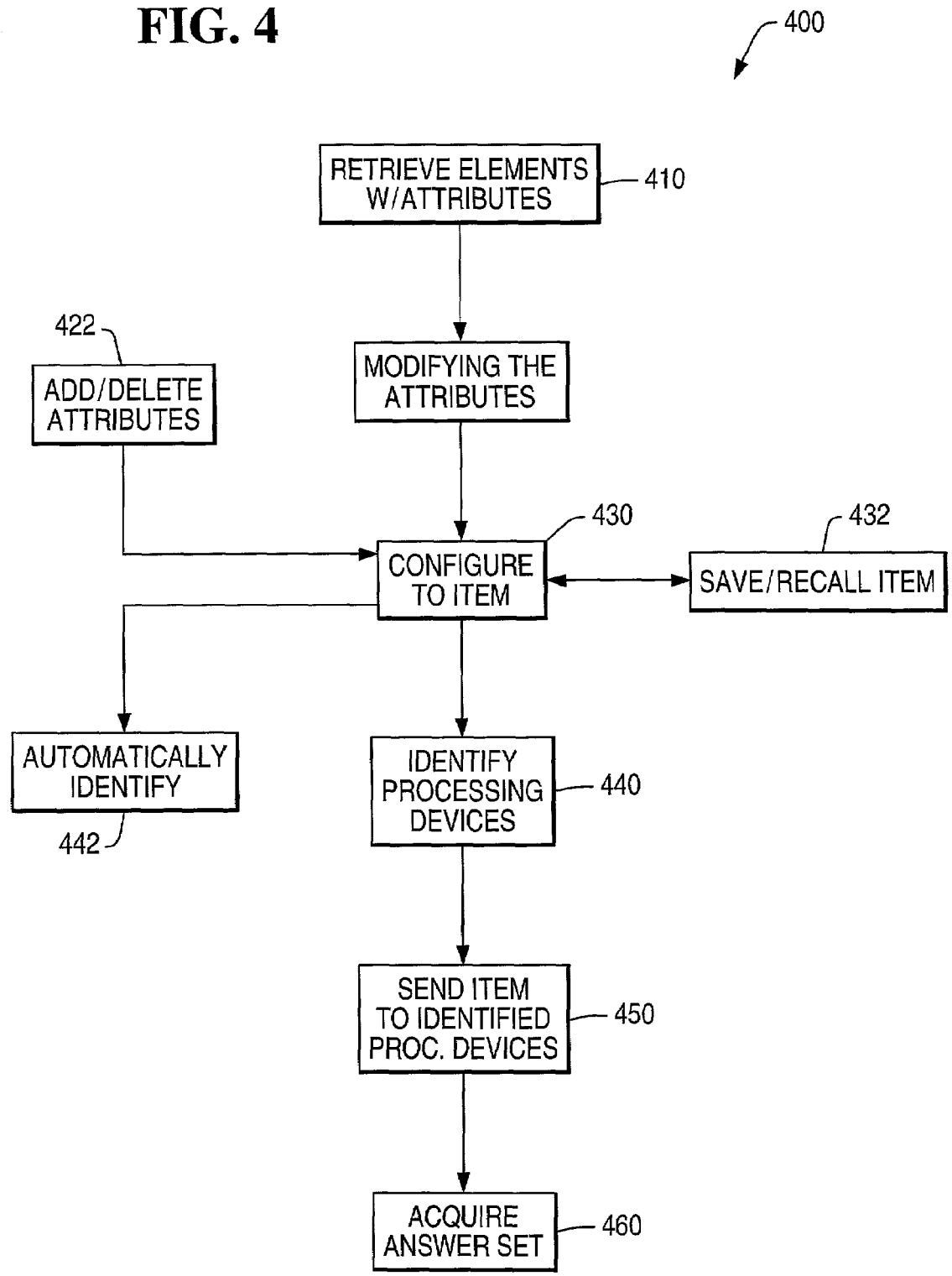
FIG. 4 is another flowchart representing another method of constructing and issuing a multi-attributal search request, according to the teachings of the present invention.

FIG. 4 illustrates another flowchart representing another method 400 for constructing and issuing a multi-attributal search request, according to the teachings of the present invention. In block 410, multiple elements associated with one or more items are received, and each element includes multiple attributes. Items represent the subject of a search request or a defined electronic report request. Elements describe or limit the subject or the report. For example, a product item includes a size element, where the size element further includes a size for women attribute, and a size for men attribute. In this way, elements can define a hierarchy within an item definition.

In some embodiments, the items, elements, and attributes are represented in an XML enabled format, permitting standard off-the-shelf XML editors to load and modify the items, elements, and attributes. Of course as one of ordinary skill in the art will readily appreciate, the items, elements, and attributes can be further constrained by pre-defined XML schemas or document type definitions (e.g., DTDs) defining the items, elements, and attributes. Moreover, more recent XML schemas can be used to also create simple and complex data types, minimum and maximum repetitions for a defined element within the schema, creation of attribute groups, restriction of ranges of values that an element can have within the schema, and the like.

In other embodiments, a customized editor is used to load and edit the items, elements, and attributes. Accordingly, in block 420, the attributes are modified. Furthermore, in some embodiments new attributes are added or existing attributes are deleted as depicted in block 422. In still more embodiments, a number of the attributes can be associated with a priority as defined by the end-user. In this way, some attributes associated with the elements can be required in any subsequent search. For example, an end-user can assign a required or high attribute designation for a price of a product, such that no search will return an answer item for the product having a price out of a range defined by the end-user for the price attribute.

When the revisions, modifications, and any priority attribute designations are completed, the revisions, modifications, and priority attribute designations combine to form a configured item in block 430. In some embodiments, the configured item can be saved, warehoused, indexed, and/or recalled from computer readable media, as depicted in block 432. Furthermore, in some embodiments the configured item can be associated with a default profile associated with the end-user.

In block 440, one or more destination processing devices are identified. Destination processing devices can include data stores, file systems, report servers, ASPs, ISPs, directories of files, websites, and the like. The destination processing devices can be identified manually by the end-user, such as through an input provided destination processing device, a selected destination device from a list of available destination devices (e.g., GUI pull-down menus), and the like. Moreover, in some embodiments the destination processing devices can be automatically identified as depicted in block 442. For example, the elements used by the end-user to construct the item can be associated with a table accessible to method 400, and by locating the elements in the table, method 400 readily identifies predetermined destination processing devices. For example, one or more elements of the configured item can be related to OLAP reports and a table accessible to method 400 includes entries for the reports that are associated with OLAP processing servers. In a similar way, one or more elements of the configured item can be related to a product or service, and the table includes entries for websites associated with one or more vendors for the products or services.

The configured item is then sent to the identified destination processing devices as a search request in block 450. Each processing device looks for the configured item based on required attributes associated with the configured item. In this way, a substantial or approximate match to the configured item is obtained when searching is performed by the destination processing devices. Once each processing device looks for the configured item, then answer items associated with substantial or approximate configured item matches is acquired as an answer set in block 460.

The answer set is then ranked, in some embodiments, where the most relevant answer item occurring within the answer set is presented in the answer set first and the least relevant answer item is presented within the answer set last. Further in more embodiments, the differences between each answer item's attributes as compared to the configured item's attributes are visually and/or audibly distinguished when presented within the answer set. In this way, an end-user can readily ascertain and acquire the relevant distinguishing features of each answer item when compared to the end-user's originally submitted configured item.

In still more embodiments, an end-user selects a desired answer-item from the answer set, and thereby establishes a processing session with a vendor associated with the answer-item. The processing session can be used to directly purchase the desired answer item, or to acquire additional or secondary information about the answer item. Moreover, in some embodiments the desired answer item may not have completely matched the originally submitted configured item, and in these embodiments the vendor can use the configured item as a requirement to provide a customized product or service to the end-user. In this way, the tenets of the present invention can provide customer relationship management (CRM) techniques for the vendor by tracking and recording configured items received for processing by the vendor.

Figure 5:
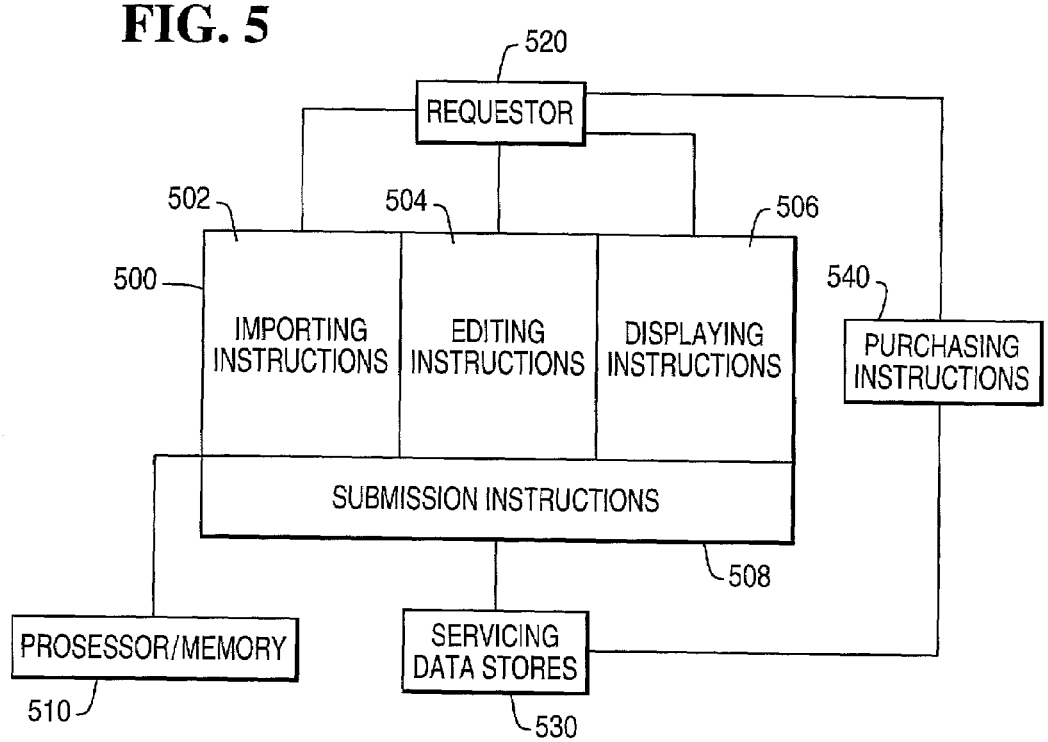
FIG. 5 is a system for constructing and issuing a multi-attributal search request, according to the teachings of the present invention.

FIG. 5 illustrates one system 500 for constructing and issuing a multi-attributal search request, according to the teachings of the present invention. The system 500 includes an importing set of executable instructions (Importer) 502, an editing set of executable instructions (Editor) 504, a displaying set of executable instructions (Displayer) 506, and a submission set of executable instructions (Submitter) 508. The Importer 502 acquires one or more elements, where the elements are associated with an item that is the subject of a search request or an electronic report request. The executable instructions 502–508 operate on a processor having memory (e.g., volatile and/or non-volatile) 510.

An end-user or requestor 520 interfaces with system 500 using the same processor/memory 510 or a different processor/memory. The requestor 520, in some embodiments, is a person inputting data/commands to the instructions 502–508 via an input device (e.g., keyboard, mouse, wand, and the like) and a display in communication with the instructions 502–508. In other embodiments, the requestor 520 is a set of executable instructions interfaced to the instructions 502–508 though one or more API modules.

The Editor 504 is operable to merge, copy, delete, save, modify, and compare the acquired one or more elements. Furthermore, the Editor is operable to generate and item from the one or more edited elements or from one or more aggregated elements. In some embodiments, the elements and the item are in XML enabled format defined by an XML schema, such that an XML editor is the Editor with minor customization made to generate the item according to the tenets of the present invention.

The submitter 508 submits a generated item to one or more servicing data stores 530. The servicing data stores 530 can be local to the processor/memory 510, or remote from the processor/memory 510. Communication between the system 500 and the servicing data stores 530 can be via a hardwired network or via a wireless network. Moreover, the processor/memory 510 can be associated with any computing device such as and by way of example only, a personal digital assistant (PDA), a cell phone, a lap top computer, a stand alone computer, a networked computer, an intelligent apparel device, an intelligent appliance device, combination devices, and the like.

The Displayer 506 is operable to present an answer set of related items where the related items are acquired from the servicing data stores 530 in response to the submitted item from the Submitter 508. The servicing data stores 530 resolve related items based on any required elements defined by the requestor 520 using the Editor 504. Only required elements will be forced by the servicing data stores 530 to be present within each of the related items. In this way, elements present within the item can vary from like elements within the related items, thus a substantial or approximate search is performed on the servicing data stores 530.

In one embodiment of system 500, the elements are in an XML-enabled format and the requestor 520 is interfaced to system 500 using an Internet WWW connection and a browser. The requestor identifies elements to import into the Editor 504 through one or more browser page interfaces using the Importer 502. The elements are modified, by the requestor 520, using the Editor 504, thereby constructing and forming an item, which will be sent to one or more servicing data stores 530 for processing. The item represents a product or service desired by the requester 520.

The requester then uses the Submitter 508 to identify one or more servicing data stores 530 and the item is submitted to the servicing data stores for processing. The servicing data stores 530 return substantial matches to the item as related items, which are received by the Displayer 506, organized and rank from most relevant related item to least relevant related item. The Displayer 506 displays each related item to the requester 520, such that different elements within each presented related item from the originally submitted item is highlighted for visual distinction. Next, the requestor 520 selects a desired related item from the list of available related items, which activates a link directly to a specific servicing data store 530 associated with the desired related item. Finally, a purchasing set of executable instructions 540 is utilized, by the requestor 520, as provided by the specific servicing data store 530 to allow the requestor 520 to purchase the desired related item directly from the specific servicing data store 530.

In another embodiment, the requestor 520 uses the Importer 502 to import one or more elements associated with an electronic report (e.g., OLAP report). The elements are then edited within the Editor 504 by the requestor 520 to generate an aggregated report (e.g., item). The Submitter 508 submits the newly defined report to one or more report servers 530 (e.g., OLAP processing servers), where a result associated with processing the new report is returned and displayed to the requestor via the Displayer 506. If one or more of the elements associated with the electronic report as edited have conflicts then in some embodiments the end-user is manually prompted to correct the conflict, or alternatively a default operation can be applied by the Editor 504 to resolve the conflict.

Figure 6:
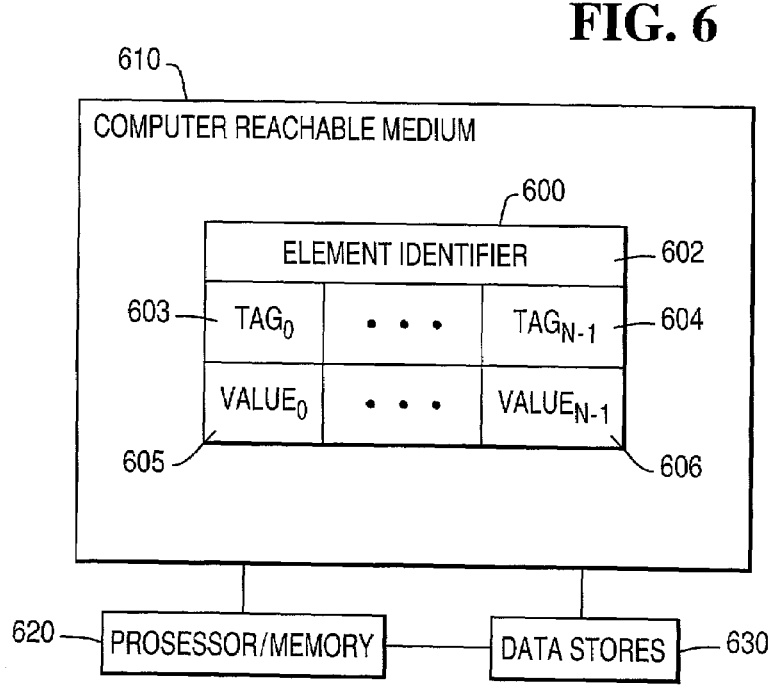
FIG. 6 is a multi-attributal search request, according to the teachings of the present invention.

FIG. 6 illustrates one multi-attributal search request 600, according to the teachings of the present invention. The search request 600 resides and is accessible from any computer readable media 610. Furthermore, although FIG. 6 depicts search request 600 as residing contiguously on a single computer readable medium 610, it is readily appreciated by one of ordinary skill in the art that the present invention is not intended to be so limited, since it is readily apparent that search request can be logically and dynamically constructed from a plurality of computer media.

Furthermore, in some embodiments the item can be text data, image data, video data, audio data, graphical data, or combination thereof. In this way, the requestor 520 can use the instructions 502–508 of system 500 to generate multi-dimensional data search in addition to multi-attributal data searches. Moreover, as will be apparent to one of ordinary skill in the art, in embodiments where the item is a report, often some of the data associated with the report will be image data and graphical data in addition to text data.

FIG. 6 illustrates one multi-attributal search request 600, according to the teachings of the present invention. The search request 600 is accessible on any computer readable media, such as medium 610. Moreover, as one of ordinary skill in the art will readily appreciate, the search request 600 need not reside contiguously on any single computer readable medium, since the search request 600 can be dynamically and logically assembled from a plurality of computer readable media.

The search request 600 includes an element identifier 602, a plurality of attribute tags 603–604, and a plurality of attribute values 605–606. Each attribute tag 603 or 604 is associated with a single attribute value 605 or 606, respectively. The element identifier 602, in some embodiments identifies the subject of the search request 600, or an electronic report request. The search request 600 can be processed from the computer readable medium 610 using any processor/memory device 620.

Furthermore, the attribute tags 603–604 and each associated attribute value 605 and 606, respectively, are modifiable by any set of executable instructions accessing the search request 600 from one or more processing/memory devices 620. The attribute tags 603–604 and each associated attribute value 605 and 606 respectively are modifiable until the search request 600 is submitted. Next, the search request 600 is submitted to one or more data stores 630. Each data store searches or processes the search request 600. When the element identifier 602 is not representative of an electronic report, the data stores 630 look for responsive items that match the element identifier 602 and any required attribute tags 603–604 and attribute values 605–606, respectively, against the related items. The attribute tags 603–604 and the attribute values 605–606 are end-user definable to include a priority status, where the priority status provides and indication to the data stores 630 as to whether the attribute tags 603–604 and attribute values 605–606 are significant in the search for responsive items. In this way, the search request 600 is used by the data stores 630 to perform multi-attributal searches against the data stores 630 and further finds substantial, but not exactly matching, responsive items.

In some embodiments, an element identifier 602 associated with a specific instance of the search request 600 is representative of an electronic report (e.g., OLAP report). In these embodiments, the data stores 630 are report processing servers (OLAP servers) and the attribute tags 603–604 along with the attribute values 605–606 represent report instruction logic, which is used by the report servers 630 to process the report identified by the element identifier 602.

The search request 600, in more embodiments, is represented in an XML-enabled format, and defined by an XML schema such that the data stores 630 can readily receive, parse, and process the search request 600. Of course as will be readily apparent to one of ordinary skill in the art, the present invention is not limited to any specific data format since any consistent data format can be employed according with the teachings of the present invention.

Furthermore, the attribute values 605–606 can be text data, image data, pointers to data, video data, audio data, numeric values, ranges of numeric values, or instruction data used to perform processing on the data stores 630. In this way, the search request 600 is flexible and dynamic providing increased functionality to any end-user utilizing the search request 600 of the present invention.

Figure 7:
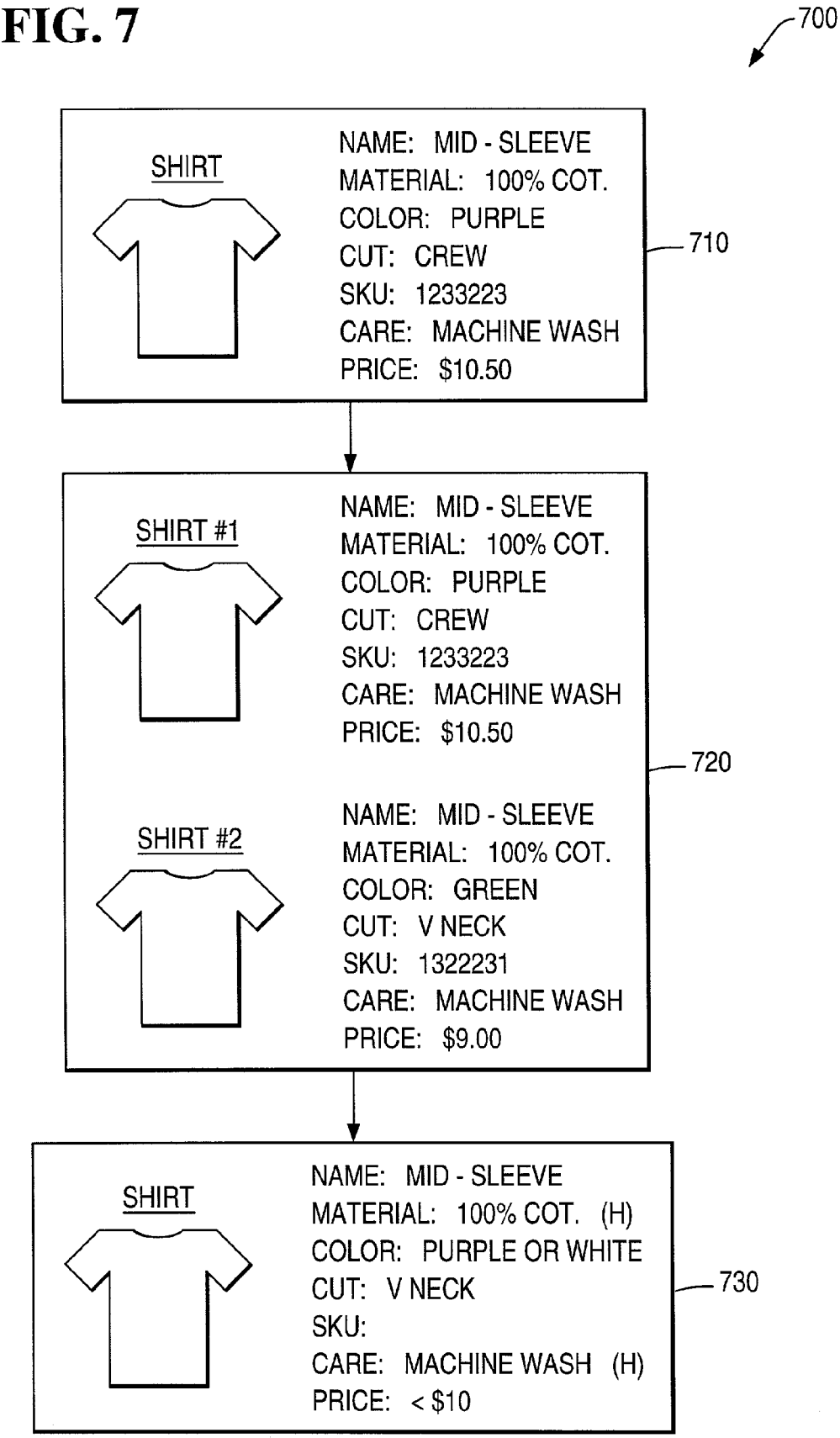
FIG. 7 is a diagram of an example embodiment for constructing a multi-attributal search request, according to the teachings of the present invention.

FIG. 7 illustrates a diagram of one example embodiment for constructing a multi-attributal search request, according to the teachings of the present invention. In FIG. 7, a series of transitions 700 are depicted in which an end-user uses the teachings of the present invention to construct an item. The item is a product identified as a shirt.

Initially, the end-user has a single shirt in block 710, having the following attribute and attribute value pairs: "name: mid-sleeve," "material: 100% cotton," "color: purple," "SKU: 1233223," "care: machine wash," and "price: $10.50." The initial shirt can be acquired by the end-user using any GUI or browser based application. Moreover, the initial shirt can be created from scratch by the end-user using the same application or a different application.

In block 720, the end-user acquires a second shirt ("shirt #2"), which is combined with the initial shirt (now identified in FIG. 7 as "shirt #1") to form a collection of shirts. The shirts have the same attribute and attribute value pairs in some instances (e.g., "name: mid-sleeve") and different attribute and attribute value pairs in other instances (e.g., "color: purple" for shirt #1 and "color: green" for shirt #2).

Next, in block 730 the end-user uses the application to create a single instance of a desired shirt, which may include attribute and attribute value pairs which existed with shirt #1 or shirt #2 (e.g., "name: mid-sleeve") or include attribute and attribute value pairs created by the end-user which was not included in shirt #1 or shirt #2 (e.g., "cut: V-neck"). Moreover, the end-user can assign a priority of high ("H") to a number of the attribute and attribute value pairs (e.g., "material: 100% cotton (H)" and "care: machine wash (H)"). Moreover, in some embodiments the priority value of high represented by "H" can also include a numeric value (e.g., integers 1,2,3, and the like) to assist in serializing or ranking any returned answer set associated with a search request.

Once a desired shirt is constructed by the end-user, the shirt can be warehoused, saved, or latter recalled by the end-user within the application. Moreover, the attribute values included ranges of values or value expressions, which are associated with instruction logic (e.g., "price: <$10"). In this way, the end-user can use the attribute and attribute value pairs to build user-defined items, and as previously discussed the items can be products, services, electronic reports, and others. When a desired and end-user defined item is constructed, the end-user can submit the item for processing to one or more data stores.

Figure 8:
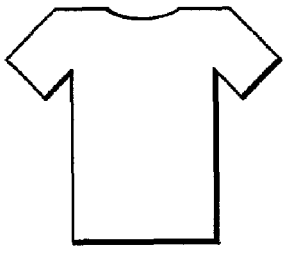
FIG. 8 is a diagram of an example embodiment for an answer set received in response to issuing a multi-attributal search request, according to the teachings of the present invention.
Figure 8:
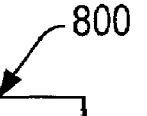
Figure 8:
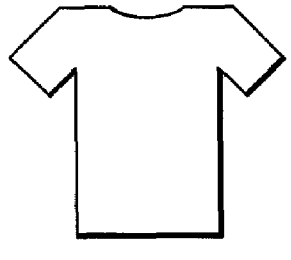

FIG. 8 illustrates a diagram of one example embodiment for an answer set 800 received in response to issuing a multi-attributal search request, according to the teachings of the present invention. After the end-user has constructed the desired item and submitted the desired item for processing to one or more data stores, an answer set 800 is received and presented to the end-user. FIG. 8 corresponds with the prior example depicted in FIG. 7.

The processing data stores search for the constructed item submitted in FIG. 7, looking for shirts having the attributes identified as H, namely "material: 100% cotton," and "care: machine wash." In the example, depicted in FIG. 8, three shirts are returned as the answer set 800 (e.g., shirt #1, shirt #2, and shirt #3). The returned shirts are organized within the answer set 800 such that the most relevant shirt, shirt #1, is listed first within the answer set 800. And, the least relevant shirt, shirt #3, is listed last within the answer set 800.

Moreover, attribute and attribute value pairs are presented to the end-user within the answer set such that differing answer attribute and answer attribute value pairs from the original constructed and submitted item are readily distinguished by the end-user (e.g., FIG. 8 includes a box around such attribute and attribute value pairs, which are shirt #2: "Price: $10.50," and shirt #3: "cut: crew, Price: $10.50").

As is readily apparent to one of ordinary skill in the art, the answer set 800 of FIG. 8 offers improved search results and answer filtering over what has been done in the past. The answer set 800 of the present invention allows an end-user to more rapidly visualize and consume answer items included in the answer set 800. Moreover, in some embodiments links include with each answer set item in the answer set 800 can be provided such that the end-user when activating the link establishes a purchasing session with a vendor associated with the selected answer item. In this way, an end-user's shopping experience is more fully automated and improved with the tenets of the present invention. Furthermore, although FIGS. 7 and 8 depict an example where an end-user constructs and submits an item represented as a product (e.g., shirt), it is readily apparent that the end-user can also construct and submits items using the present invention where the items represent a service, a search report, a person, a place, a historical/sporting event, a topic, and the like.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented method of constructing and issuing a multi-attributal search request, comprising:
   receiving at a processing unit a first item from a first on-line data store, said first item having one or more attributes, each attribute including an attribute value;
   modifying a number of the attribute values to create a desired item;
   electronically issuing the desired item to one or more additional on-line data stores as a search request;
   receiving at said processing unit in response to the search request one or more answer items associated with a substantial match of the desired item from one or more of the additional on-line data stores, wherein the answer items include answer attributes, each answer attribute having an answer attribute value; and
   automatically ranking the one or more answer items based on each answer item's attribute values when compared against the desired item's attribute values.

2. The method of claim 1, further comprising:
   identifying a desired answer item; and
   establishing a processing session with a vendor associated with the desired answer item.

3. The method of claim 2, wherein in establishing the processing session, the processing session is a hypertext link to a web site of the vendor used to electronically purchase the desired answer item.

4. The method of claim 1, wherein in receiving the first item, the first item, the one or more attributes, and the one or more attribute values are parsed from an extensible markup language (XML) enabled format.

5. The method of claim 1, wherein in receiving the first item, the first item identifies a product or service offered by a vendor over the Internet.

6. The method of claim 1, wherein in receiving the first item, the first item is a aggregation of a plurality of electronic reports.

7. The method of claim 6, wherein in receiving the first item, the reports are online analytical reports (OLAP), the first data store is an OLAP server, and wherein in receiving in response to the search request the one or more answer items associated with the substantial match of the desired item from one or more of the additional data stores, the one or more additional data stores are OLAP servers and the substantial match is acquired by processing queries identified in the desired item as the search request.

8. A method of constructing and issuing a multi-attributal search request, comprising:
   retrieving at a local processing unit item elements having attributes from one or more remote processing devices;
   modifying one or more of the attributes;
   configuring the item elements including those with modified attributes into a desired item;
   identifying one or more destination processing devices to send the desired item as a search request;
   electronically sending the search request to the one or more identified additional destination processing devices, wherein a match occurs on a number of the one or more identified additional destination processing devices, if the search request is an approximate match for one or more answer items residing on the one or more additional destination processing devices; and
   acquiring at said local processing unit an answer set having the one or more answer items from the one or more additional destination processing devices.

9. The method of claim 8, further comprising organizing the answer set, wherein the most approximate matching answer item is presented first and the least approximate matching answer item is presented last within the answer set.

10. The method of claim 8, wherein in retrieving the item elements, the item elements are defined by an extensible markup language (XML) schema and tagged in an XML enabled format.

11. The method of claim 8, wherein in identifying the one or more destination processing devices, the identified one or more destination processing devices are identified from a graphical user interface selection list.

12. The method of claim 8, wherein in identifying the one or more destination processing devices, the identified one or more destination processing devices are identified based on an association automatically identified between the retrieved item elements and one or more vendors.

13. The method of claim 8, further comprising:
   saving the desired item; and
   recalling the saved desired item if requested.

14. The method of claim 8, further comprising adding one or more additional attributes to the desired item.

15. A search construction and submission system, comprising:
   an importing set of executable instructions that acquires one or more item elements from one or more remote data stores;
   an editing set of executable instructions that merges, copies, deletes, saves, modifies, and compares the one or more item elements and generates a desired item therefrom;
   a submission set of executable instructions that submits said desired item to one or more remote servicing data stores; and
   a displaying set of executable instructions that presents an answer set of related items associated with the desired item, wherein the related items are acquired from the one or more servicing data stores in response to the submitted desired item from the submission set of executable instructions.

16. The system of claim 15, wherein the displaying set of executable instructions presents the related items by highlighting one or more related item elements that differ from the corresponding desired item elements.

17. The system of claim 15, wherein the importing set of executable instructions acquires the item in an extensible markup language enabled format (XML).

18. The system of claim 15, wherein the one or more item elements are associated with at least one of a product, a service, and an electronic report, and wherein the one or more servicing data stores are associated with vendors.

19. The system of claim 15, wherein the submission set of executable instructions interfaces with the one or more servicing data stores through a browser connected to the Internet, and the desired item is submitted in an XML enabled format.

20. The system of claim 15, further comprising a purchasing set of executable instructions that establishes a purchase session with a vendor for a selected related item included within the answer set.

* * * * *